US005137312A

United States Patent [19]

Tang

[11] Patent Number: 5,137,312

[45] Date of Patent: Aug. 11, 1992

[54] MOTOR VEHICLE DOOR LOCK CONTROLLING DEVICE

[76] Inventor: Chien-I Tang, 2 F., No. 154, Sec. 4, Chung Hsin Rd., San Chung, Taipei Hsien, Taiwan

[21] Appl. No.: 737,257

[22] Filed: Jul. 29, 1991

[51] Int. Cl.[5] .................... E05C 13/06; F16H 25/20

[52] U.S. Cl. .................... 292/336.3; 292/201; 74/625

[58] Field of Search .................... 292/201, 336.3; 74/89.5, 625

[56] References Cited

U.S. PATENT DOCUMENTS 3,767,242 10/1973 Quantz .................... 292/336.3 X
4,315,649 2/1982 Lutz .................... 292/336.3 X
4,478,155 12/1984 Kobayashi .................... 292/336.3
4,706,512 11/1987 Mckernon et al. .................... 292/336.3 X
4,708,378 11/1987 Ingenhoven .................... 292/336.3 X
4,723,454 2/1988 Periou et al. .................... 292/336.3 X
4,739,677 4/1988 Kofink et al. .................... 292/336.3 X
4,966,266 10/1990 Yamada et al. .................... 74/625 X
5,029,915 7/1991 Wilkes .................... 292/336.3
5,037,145 8/1991 Wilkes .................... 292/336.3

*Primary Examiner*—Richard E. Moore
*Attorney, Agent, or Firm*—Fleit, Jacobson, Cohn, Price, Holman & Stern

[57] ABSTRACT

A motor vehicle door lock controlling device, comprising a housing having set therein a driven rod which is fastened on the gear shaft of a driven gear through screw joint, a driving motor which has a driving gear mounted on the output shaft thereof and engaged with said driven gear, and a locking control motor which has an oscillating block mounted on the output shaft thereof and controlled to engage in or released from the teeth on said driven gear. Rotating the driving gear causes the driven rod to lock and unlock a door lock. Rotating the locking control motor causes the oscillating block to lock up or release the driven gear. A projecting block is made on the driven rod to trigger a microswitch during the movement of the driven rod, causing said microswitch to produce a corresponding signal to a control box so as to lock or unlock the other linked door locks.

3 Claims, 5 Drawing Sheets

MOTOR VEHICLE DOOR LOCK CONTROLLING DEVICE

BACKGROUND OF THE INVENTION

The present invention relates to a motor vehicle door lock controlling device and relates more particularly to a motor vehicle door lock controlling device which is inexpensive to manufacture, easy to install and practical in use and, which occupies less space.

In Taiwanese Patent No. 79,208,920 there is disclosed a utility model of motor vehicle door lock controlling device. This structure of motor vehicle door lock controlling device is shown in FIG. 1. As illustrated, the motor vehicle door lock controlling device is generally comprised of a locking control motor (100) and a driving motor (110), a driving rod (130) and a driven rod (132). Inserting the key in the key hole of either door induces an electric current to turn on the locking control motor (100). Rotating the locking control motor (100) causes the gear (101) on the output shaft of the locking control motor (100) to move a locking bar (102) backwards to an unlocking position. Once the locking bar (102) is released from its locking position, the driving motor (110) is immediately turned on to carry the driving rod (130) to rotate via two gears (111) and (131), and therefore, the driven rod (132) is moved outwards causing the link which is connected to the fastening hole (133) on the front end of the driven rod (132) to unlock door locks. Because the locking bar (102) is made from a rack it occupies much space to install and the teeth thereof tend to be damaged or worn off easily.

SUMMARY OF THE INVENTION

The present invention has been accomplished to eliminate the aforesaid problems. It is therefore an object of the present invention to provide a motor vehicle door lock controlling device which is compact, inexpensive to manufacture, durable in use and easy to install.

According to the present invention, there is provided a motor vehicle door lock controlling device which is generally comprised of a driven rod, a driving motor and a locking control motor. The driving motor has a driving gear mounted on the output shaft thereof and engaged with a driven gear which is mounted on a screw rod which is fastened in the driven rod through screw joint. The locking control motor has an oscillating block mounted on the output shaft thereof, which oscillating block has a shoulder portion which is carried to engage in the teeth on the driven gear, when the output shaft of the locking control motor is rotated through a predetermined angle, causing the driven gear to be prohibited from rotary motion. The driven rod has a projecting block which is moved to turn on or off a microswitch during the movement of the driven rod, causing said microswitch to produce a corresponding signal to a control box so as to lock or unlock the linked door locks. Because of the arrangement of the oscillating block, the driven gear is locked or released directly controlled by the locking control motor. By means of the arrangement of the projecting block on the driven rod, the microswitch is simultaneously triggered by the driven rod to lock or unlock the other door locks synchronously.

DETAILED DESCRIPTION OF THE PREFERRED EMBODIMENT

Figure 1:
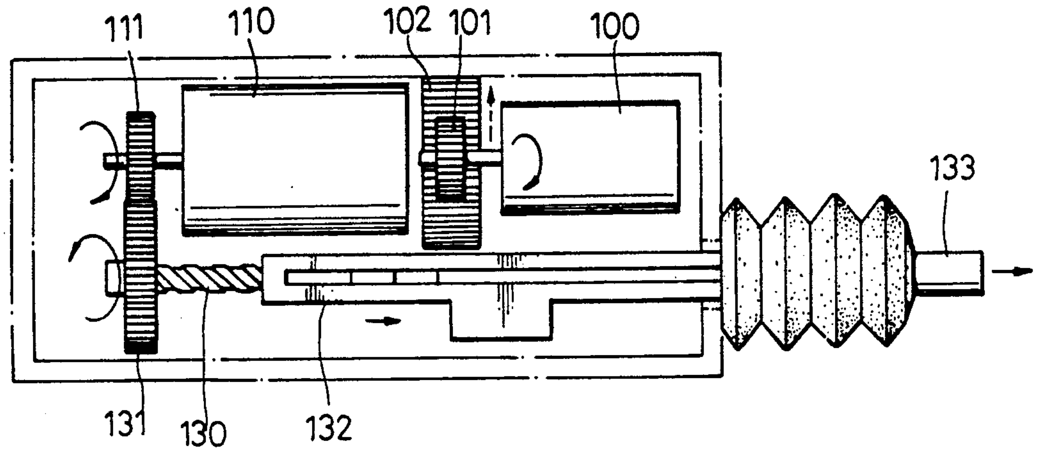
(PRIOR ART) FIG. 1
FIG. 1 illustrates a motor vehicle door lock controlling device according to the prior art.
Figure 2:
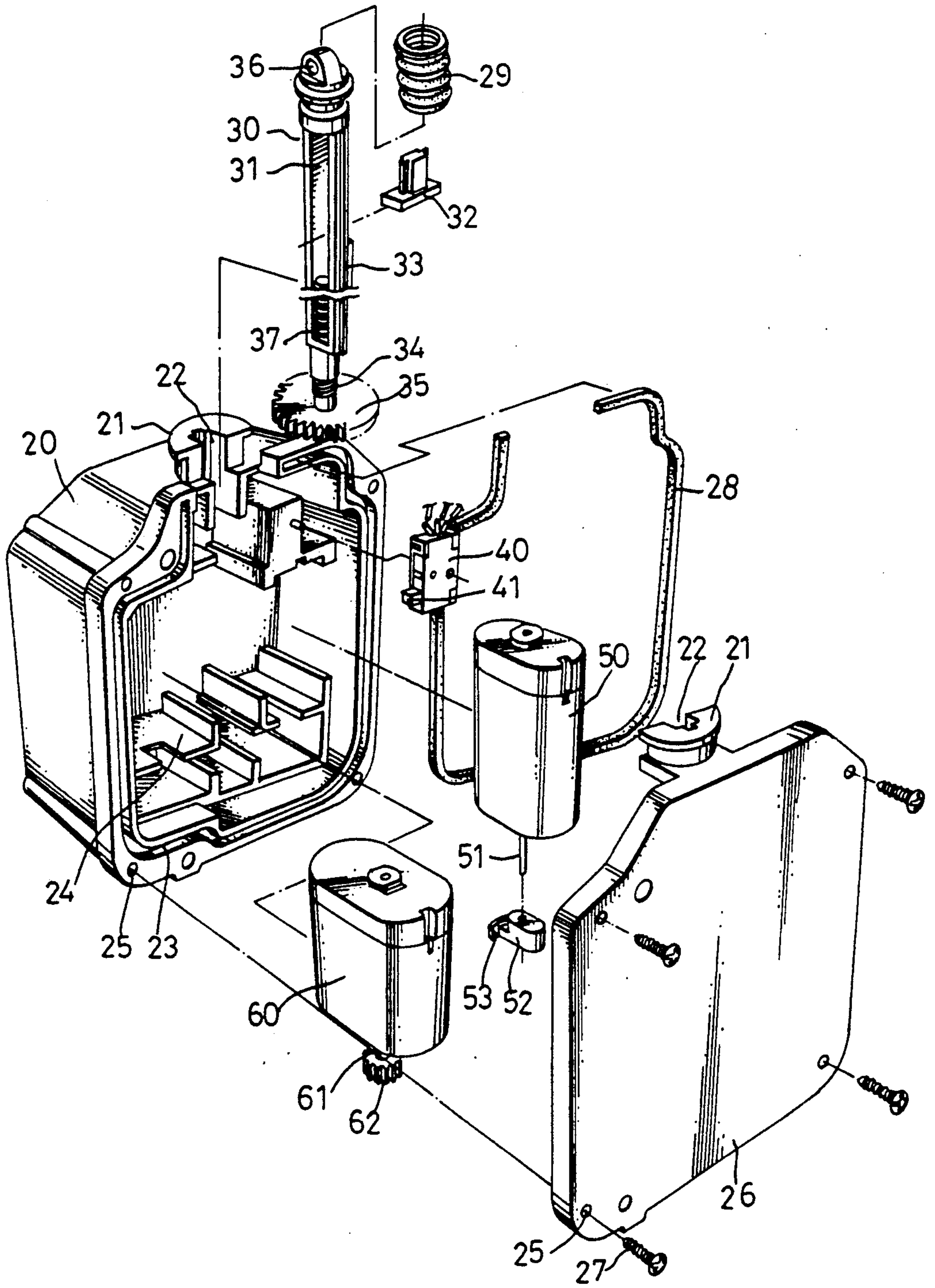
FIG. 2 is an exploded perspective view of the preferred embodiment of the motor vehicle door lock controlling device of the present invention.

Referring to FIG. 2, therein illustrated is the preferred embodiment of the motor vehicle door lock controlling device of the present invention which is generally comprised of a casing 20 covered with a cover 26. The internal space of the casing 20 is divided by a plurality of partition plates 24 into a plurality of separate chambers for holding a driven rod 30, a locking control motor 50, a driving motor 60, a micro-switch 40 and the related parts thereof. The casing 20 has a flange 21 at the top which incorporates with the top flange 21 on the cover 26 into a seat which defines therein a hole 22 for the sliding therein of the driven rod 30. The driven rod 30 has an elongated slot 31 through the body thereof at the middle in longitudinal direction, a fastening hole 36 at the front end thereof, and a bolt hole 37 on the bottom end thereof for fastening a screw rod 34. The screw rod 34 has one end inserted into the elongated slot 31 through the bolt hole 37 and connected to a supporting block 32 and an opposite end fixedly fastened in a driven gear 31. The supporting block 32 has two opposite side edges bilaterally protruding beyond the driven rod 30 and stopped against the inner wall surface inside the hole 22. The driven gear 35 has a stub rod 38 longitudinally aligned with the screw rod 34 at an opposite end. The stub rod 38 is inserted in a supporting hole 39 inside the casing 20. The supporting block 32 and the supporting hole 39 are provided to support the screw rod 34 permitting it to be driven to rotate on its own axis. Rotating the screw rod 34 causes the driven rod 30 to displace in longitudinal direction. The driven rod 30 further comprises a projecting block 33 at a suitable location which presses or releases the switch rod 41 on the microswitch 40, during the movement of the driven rod 30, causing the microswitch 40 to send a locking or unlocking signal to a control box (not shown) and therefore, the locks on all linked doors are simultaneously locked or unlocked. The two motors 50 and 60 are fastened in the casing 20 at two opposite locations relative to the driven rod 30. The driving motor 60 has a driving gear 62 mounted on the output shaft 61 thereof and engaged with the driven gear 35 of the screw rod 34. The locking control motor 50 has an oscillating block 52 mounted on the output shaft 51 thereof. The oscillating block 52 has a shoulder portion 53 which is moved to engage in the gap between the teeth on the driven gear 35 when the locking control motor 50 is turned on. Therefore, the rotary motion of the driven gear 35 is controlled. There is also provided a rubber packing 28 mounted on a groove 23 around the peripheral edge of the casing 20. Once the aforesaid parts are fastened in place, the cover 26 is covered on the casing 20 and secured in place by fastening screws 27 in screw holes 25 and finally, a protective covering 29 is mounted on the driven rod 30.

Figure 3:
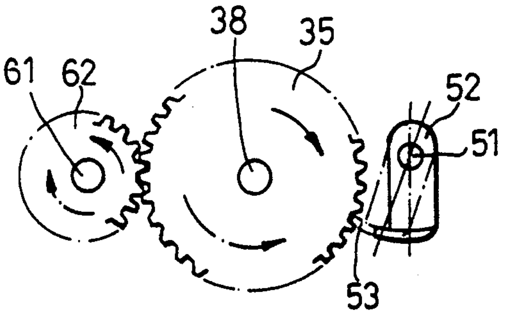
FIG. 3 illustrates that the oscillating block is releasably engaged in the the driven gear which is engaged with the driving gear on the output shaft of the driving motor.
Figure 4:
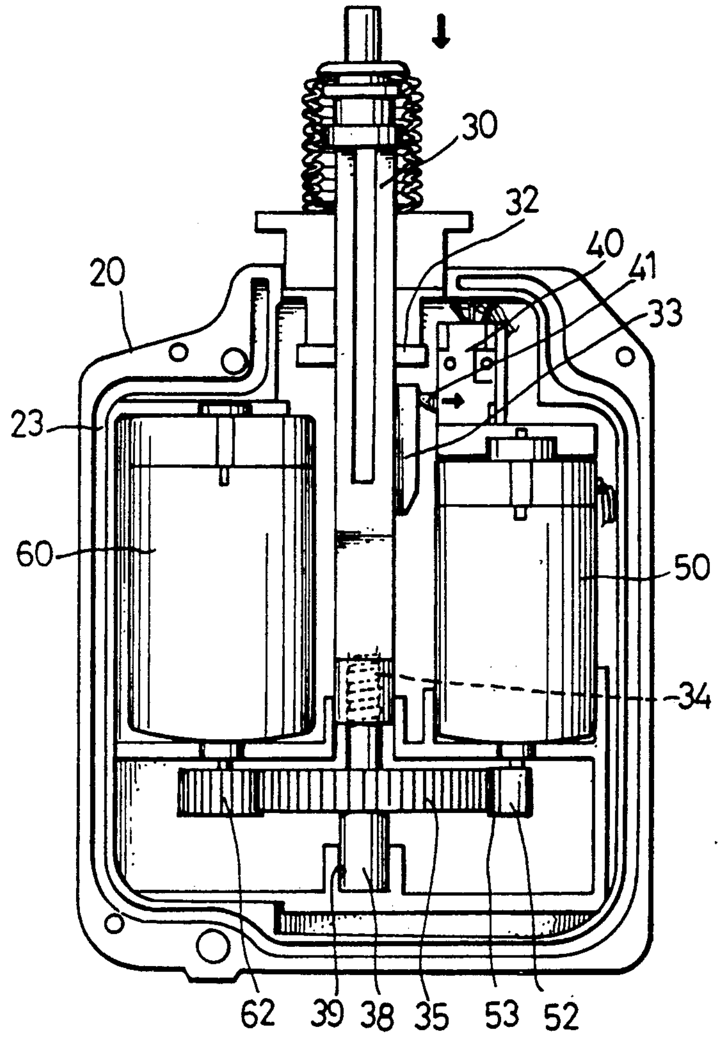
FIG. 4 is a sectional elevation of the preferred embodiment of the motor vehicle door lock controlling device of the present invention under the locking mode.

The locking control and driving motors 50 and 60 are controlled to operate by a control box (not shown) Referring to FIGS. 3 and 4, when either door lock is locked by a key, the locking signal is transmitted through the control box to turn on the driving motor 60, causing the driving gear 62 to rotate. Rotating the driving gear 62 causes the driven gear 35 and the screw rod 34 to rotate, and therefore, the driven rod 30 is forced to move downwards. When the driven rod 30 moves downward, the door lock link (not shown) which is connected to the fastening hole 36 on the top end of the driven rod 30 is carried to move the linked door locks from the unlocking position to the locking position. At the same time, the projecting block 33 of the driven rod 30 presses on the switch rod 41 of the microswitch 40 causing it to provide a locking signal to the control box, causing it to lock up all linked door locks. When all linked door locks are moved to the locking position, the control box sends a control signal to the locking control motor 50 causing it to rotate. Rotating the locking control motor 50 causes the oscillating block 52 to move the shoulder portion 53 thereof into the gap between the teeth on the driven gear 35, and therefore, the driven gear 35 is prohibited from rotary motion. Therefore, any pulling force applied at the driven rod 30 can not cause the linked door locks to move back to the unlocking position.

Figure 5:
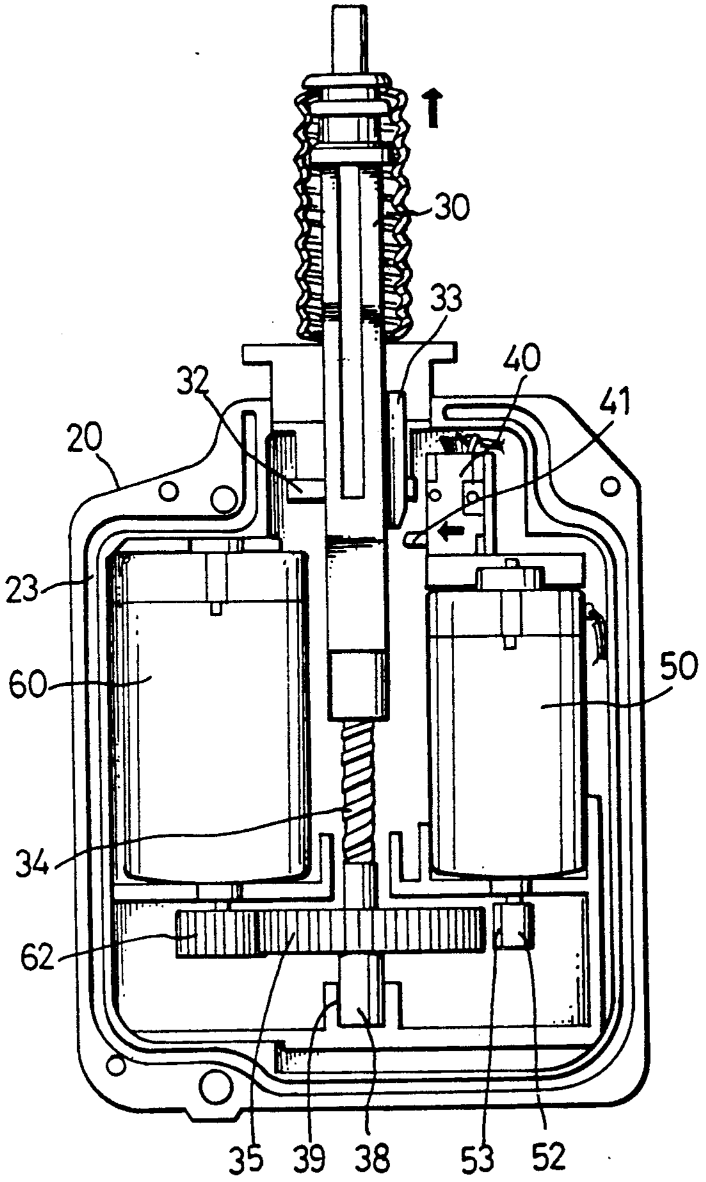
FIG. 5 is a sectional elevation of the preferred embodiment of the motor vehicle door lock controlling device of the present invention under the unlocking mode.

Referring to FIG. 5 and seeing FIG. 3 again, when either door lock is unlocked by a key, the unlocking signal is sent to the locking control motor 50 via the control box, causing its output shaft 51 to rotate in reverse direction. Therefore, the shoulder portion 53 of the oscillating block 52 is disconnected from the driven gear 35. At the same time, the control box gives a signal to drive the driving motor 60, causing the driven rod 30 to move upwards. When the driven rod 30 moves upwards, the door lock link is forced to move the linked door locks to the unlocking position. Because the projecting block 33 of the driven rod 30 is released from the switch rod 41 of the microswitch 40 when the driven rod 30 moves upwards, the microswitch 40 gives a signal to the control box, causing it to unlock all linked door locks.

In general, the motor vehicle door lock controlling device of the present invention is arranged to match with the control box in the central control system of a motor vehicle for controlling the door locks thereof. Therefore, when the door locks are locked by a key, they can not be opened by inserting a lever into the channel for window glass.

While the present invention has been described in conjunction with the preferred embodiment thereof, it is evident that many alternatives, modifications, and variations will become apparent to those skilled in the art. For example, automatic locking process can be controlled through the speedometer, i.e. the door locks are automatically locked when the speed of the motor vehicle exceeds by a fixed range, or automatic unlocking process can be automatically executed by means of detecting the current through the jump-spark coil when the car engine is stopped. Recognizing that various modifications are apparent, the scope herein shall be deemed as defined in the claims set forth hereinafter.

What is claimed is:

1. A motor vehicle door lock controlling device, comprising a housing formed of a casing and a cover, said housing defining therein a holding chamber divided by a plurality of partition plates into a plurality of compartments for holding a locking control motor, a driving motor and a driven rod, said housing having a flange at the top defining therein a slot for the sliding therein of said driven rod, said driven rod having a top end extending out of said flange, said top end being connected to a motor vehicle's door locks through a link, and a bottom end connected to a screw rod through a screw joint, said screw rod having an opposite end coupled with a driven gear, and characterized in that said locking control and driving motors are disposed in parallel with each other at two opposite sides relative to said driven rod, said driving motor having a driving gear mounted on the output shaft thereof, said driving gear being constantly engaged with said driven gear, said locking control motor having an oscillating block secured to the output shaft thereof, said oscillating block having a shoulder portion releasably engaged in the gap between the teeth on said driven gear to prohibit it from rotary motion when the output shaft of said locking control motor is rotated to a predetermined position.

2. The motor vehicle door lock controlling device of claim 1, wherein said driven rod has a projecting block raised from the peripheral surface thereof at the middle, said projecting block being moved to press on or release from the switch rod by a microswitch when said driven rod moves downwards or upwards.

3. The motor vehicle door lock controlling device of claim 1, wherein said casing has a groove on the peripheral edge thereof in which a rubber packing is fastened to seal the gap between said casing and said cover.

* * * * *